Figure 1:
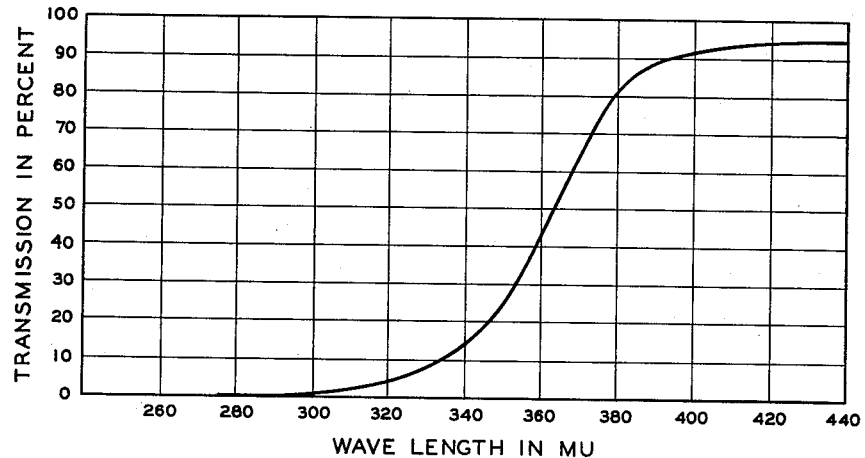

March 24, 1964    J. C. ECK    3,126,408
PURIFICATION OF ACRYLONITRILE
Filed Feb. 1, 1961

INVENTOR
JOHN C. ECK
BY
ATTORNEY

United States Patent Office 3,126,408
Patented Mar. 24, 1964

3,126,408
PURIFICATION OF ACRYLONITRILE
John C. Eck, Convent, N.J., assignor to Allied Chemical Corporation, New York, N.Y., a corporation of New York
Filed Feb. 1, 1961, Ser. No. 86,468
4 Claims. (Cl. 260—465.9)

This invention relates to a process for the purification of acrylonitrile. More particularly it relates to a process for removing divinyl acetylene and other compounds with internal acetylenic groups which are difficult to separate from acrylonitrile.

Compounds with internal acetylenic groups are difficult to remove from acrylonitrile by ordinary fractional distillation or the usual chemical or physical means of separation. Since impurities of this type prevent the monomer from possessing specification grade properties for polymer production, they interfere with the use of this material for the production of commercial products such as synthetic rubber and synthetic fibers. It is therefore essential that compounds with the internal acetylenic groups be removed.

For this reason, much work has been done in this field and a great many methods have been developed by means of which impurities can be removed from the acrylonitrile. While most of the methods developed can be used to improve the purity of the acrylonitrile, most of them are complicated and usually leave compounds with internal acetylenic groups as contaminants in the acrylonitrile.

It is therefore an object of this invention to improve the purification techniques of the prior art and to develop a process which is more efficient and adapted for more complete removal of impurities, particularly the divinyl acetylene and other compounds containing internal acetylenic groups.

It is a further object to develop a process of the aforementioned type which will enable one to obtain an extremely pure acrylonitrile in an economical manner.

It has been found that these objects and other advantages can be obtained by removing the bulk of the impurities by distillation in the presence of a stabilizer, treating the distilled product with anhydrous aluminum chloride and then separating the treated acrylonitrile from an ammoniacal cuprous chloride solution.

Among the impurities which may be present in crude acrylonitrile produced from acetylene and hydrogen cyanide with the aid of an aqueous cuprous chloride catalyst are hydrogen cyanide, cyanogen, acetylene, diacetylene, acetaldehyde, paraldehyde, vinyl chloride, butadiene, vinyl acetylene, divinyl acetylene, ethinylbutadiene, chloroprene, vinyl chloroprene, cyanobutadiene, butadiene nitrile, lactonitrile, crotonaldehyde and polymers of acetylene and hydrogen cyanide. The bulk of these impurities can be removed from the acrylonitrile by distillation, preferably using about 0.1% cuprous chloride as a stabilizing agent. Any soluble or solubilized cuprous salt could be used for this purpose. By this means a chlorine-free distillate boiling within the range of 76.5 to 77° C. can be obtained.

In accordance with this invention, this distillate which still contains compounds with internal acetylenic groups is then treated with say about one-half to 4% by weight of anhydrous aluminum chloride. The amount necessary will vary depending upon the amount of impurity present. With acrylonitrile prepared as described above and subjected to distillation in the presence of cuprous chloride stabilizer, 4% aluminum chloride is adequate but more can be used, e.g. 10% or even more. After the aluminum chloride has been added to the distillate and mixed therewith, it is allowed to stand for a period of about thirty minutes. During this time, an exothermic reaction takes place and the solution takes on a yellow coloration, the intensity of which reaches a maximum at the end of the reaction.

Up to about 4% cuprous chloride is then added along with sufficient ammonium chloride to solubilize the cuprous salt. This should be about one half the weight percent of the cuprous chloride used. The mixture is then made alkaline with an ammonium hydroxide solution thereby forming a soluble cuprous ammonium complex. Upon distillation, one obtains an azeotropic, two-phase mixture of acrylonitrile and water in which the water content is about 12%. This mixture can be separated into its components by decantation. When the acrylonitrile layer is distilled, a product of extremely high purity is obtained. This product will not only pass the usual specifications required of acrylonitrile suitable for the production of commercial products such as synthetic rubber and synthetic fiber, but will contain less impurities than the products normally used for commercial production.

*Example*

80 parts by weight of crude acrylonitrile were fractionally distilled with 0.1% by weight of cuprous chloride stabilizer. The cup-distilling within the temperature range 76.5 to 77.5° C. (42 parts by weight) was then mixed with 1.7 parts by weight of anhydrous aluminum chloride and let stand for one-half hour at room temperature. During this time, the mixture took on a yellow color whose intensity reached a maximum just prior to the expiration of this time interval. 1.7 parts by weight of cuprous chloride and .85 part by weight of ammonium chloride were then added to the mixture and refluxed for one hour. This mixture was then made alkaline with ammonium hydroxide after which it was distilled as a constant boiling mixture of acrylonitrile and water. The acrylonitrile was separated from the resulting two-phase system by decantation, and redistilled.

The distillate so obtained not only passed the specifications for commercial use, but when subjected to a selective ultra-violet comparative absorption test with one of the purest commercial products available, it was impossible to note any impurities in the product. This test was carried out with a Beckman spectro-photometer. A redistilled sample of a pure commercial product was used as a reference standard. The instrument was set for 100% transmission with the reference standard and the percent transmission of the acrylonitrile sample was determined at various wave length settings in the spectral range of 250 to 450 mu. However, by reversing the above procedure and using a sample of the acrylonitrile purified in accordance with this invention as the reference standard set at 100% transmission, the impurities in the redistilled commercial acrylonitrile could be detected.

FIGURE 1 of the drawings is an example of the curve obtained as a result of a selective ultra-violet comparative absorption test in which the redistilled commercial acrylonitrile was used as the reference standard and crude acrylonitrile merely distilled from cuprous chloride stabilizer, was compared therewith. From the curve it can readily be seen that the impurities in the sample cause substantially all of the light rays between 250 mu and 340 mu to be absorbed.

Figure 2:
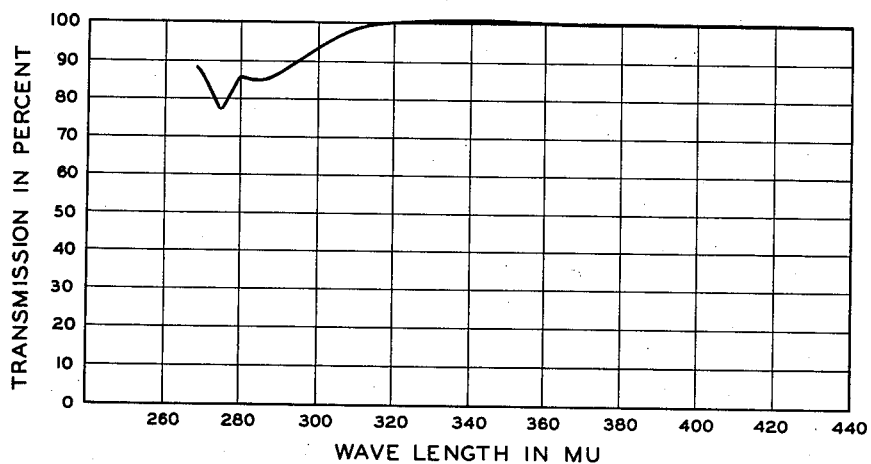

FIGURE 2 of the drawings is an example of the curve obtained as a result of a selective ultra-violet comparative test in which the redistilled commercial acrylonitrile was used as the sample and compared with the acrylonitrile prepared in accordance with this invention. From the curve there shown it is readily apparent that there are impurities in the redistilled commercial product not present in the acrylonitrile purified in accordance with this invention, which impurities absorb some of the light rays in the range 268–320 mμ.

Although certain preferred embodiments of the invention have been disclosed for the purpose of illustration, it will be evident that various changes and modifications can be made therein without departing from the scope and spirit of the invention; for example, it is of course realized that there are many methods other than the one given above by means of which the bulk of the impurities can be removed. The crux of the invention herein disclosed lies in the use of the anhydrous aluminum chloride to remove compounds with internal acetylenic groups.

I claim:

1. The method of purifying crude acrylonitrile containing as a contaminant a compound having an internal acetylenic group, which comprises removing the major proportion of impurities by distilling the acrylonitrile therefrom in the presence of a stabilizer selected from the group consisting of soluble cuprous salts and solubilized cuprous salts, mixing the acrylonitrile distillate with anhydrous aluminum chloride to cause reaction of residual impurities, thereafter adding cuprous chloride, ammonium chloride, ammonium hydroxide and water to form an aqueous solution of cuprous ammonium complex, and separating by azeotropic distillation the acrylonitrile from the aqueous solution whereby said contaminant is removed from said acrylonitrile.

2. The method of purifying crude acrylonitrile containing as a contaminant a compound having an internal acetylenic group, which comprises removing the major proportion of impurities by distilling the acrylonitrile therefrom in the presence of a stabilizer selected from the group consisting of soluble cuprous salts and solubilized cuprous salts, mixing the acrylonitrile distillate with anhydrous aluminum chloride to cause reaction of residual impurities, thereafter adding cuprous chloride and ammonium chloride, refluxing the mixture and then adding ammonium hydroxide and water to form an aqueous solution of cuprous ammonium complex, and separating by azeotropic distillation the acrylonitrile from the aqueous solution whereby said contaminant is removed from said acrylonitrile.

3. The method of purifying crude acrylonitrile containing as a contaminant therein a compound having an internal acetylenic group which comprises distilling the crude acrylonitrile in the presence of a cuprous chloride stabilizer to remove the major portion of the impurities, admixing 0.5 to 4% by weight of anhydrous aluminum chloride with the distillate, allowing the mixture to stand until the reaction brought about by said admixture comes to completion, adding up to 4% cuprous chloride, sufficient ammonium chloride to solubilize the cuprous chloride, and sufficient aqueous ammonium hydroxide solution to form an alkaline solution and thus forming a soluble cuprous ammonium complex in admixture therewith, and separating by azeotropic distillation the treated acrylonitrile from ammoniacal cuprous chloride solution whereby said contaminant is removed from said acrylonitrile.

4. The method of purfying crude acrylonitrile containing as a contaminant therein a compound having an internal acetylenic group which comprises distilling the crude acrylonitrile in the presence of about 0.1% of cuprous chloride to remove the major portion of the impurities, admixing 0.5 to 4% by weight of anhydrous aluminum chloride with the distillate, allowing the mixture to stand for about one-half hour to allow the reaction brought about by said admixture to come to completion, adding up to about 4% cuprous chloride, and up to about 2% ammonium chloride, refluxing said mixture, adding aqueous ammonium hydroxide solution to form an alkaline solution, and separating by azeotropic distillation the treated acrylonitrile from ammoniacal cuprous chloride solution whereby said contaminant is removed from said acrylonitrile.

References Cited in the file of this patent

UNITED STATES PATENTS

| | | |
|---|---|---|
| 2,656,376 | Martino | Oct. 20, 1953 |
| 2,782,149 | Sunden et al. | Feb. 19, 1957 |
| 3,007,853 | Patron et al. | Nov. 7, 1961 |